(12) United States Patent
Cha et al.

(10) Patent No.: US 12,550,116 B2
(45) Date of Patent: Feb. 10, 2026

(54) METHOD FOR DETERMINING POSITIONING INTEGRITY BASED ON SPEED OF LOCATION ESTIMATION

(71) Applicant: Nokia Technologies Oy, Espoo (FI)

(72) Inventors: Hyun-Su Cha, Naperville, IL (US); Ryan Keating, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 324 days.

(21) Appl. No.: 18/473,773

(22) Filed: Sep. 25, 2023

(65) Prior Publication Data

US 2024/0114481 A1 Apr. 4, 2024

Related U.S. Application Data

(60) Provisional application No. 63/411,310, filed on Sep. 29, 2022.

(51) Int. Cl.
*H04W 64/00* (2009.01)
*G01S 5/02* (2010.01)

(52) U.S. Cl.
CPC ......... *H04W 64/006* (2013.01); *G01S 5/0244* (2020.05)

(58) Field of Classification Search
CPC .................................................. H04W 4/029
USPC ..................................................... 455/456.1
See application file for complete search history.

(56) References Cited

U.S. PATENT DOCUMENTS

| | | | |
|---|---|---|---|
| 9,801,154 B1* | 10/2017 | Chen | H04W 4/02 |
| 2003/0004640 A1* | 1/2003 | Vayanos | G01S 5/14 |
| | | | 342/357.68 |
| 2014/0357301 A1* | 12/2014 | Burroughs | G01S 19/34 |
| | | | 455/456.2 |
| 2018/0284215 A1* | 10/2018 | Peng | G01S 5/0218 |
| 2024/0004058 A1* | 1/2024 | Duan | G01S 13/878 |

FOREIGN PATENT DOCUMENTS

WO 2022/155013 A1 7/2022

OTHER PUBLICATIONS

"3rd Generation Partnership Project; Technical Specification Group Radio Access Network; LTE Positioning Protocol (LPP) (Release 17)", 3GPP TS 37.355, V17.1.0, Jun. 2022, pp. 1-345.

(Continued)

*Primary Examiner* — Qutbuddin Ghulamali
(74) *Attorney, Agent, or Firm* — Barta Jones, PLLC

(57) ABSTRACT

There is provided an apparatus, and corresponding meth-od, configured to receive, from a network element, an indi-cation that a terminal device is to determine a current convergence speed of a positioning algorithm used to deter-mine a position result of the terminal device; determine the position result of the terminal device using the positioning algorithm; determine the current convergence speed of the positioning algorithm used when determining the position result of the terminal device; determine a relative conver-gence speed of the positioning algorithm, based on the cur-rent convergence speed; and indicate to the network ele-ment at least one of: the relative convergence speed, at least one value obtained based on the current convergence speed, an integrity result of the determined position result, or the determined position result of the terminal device.

20 Claims, 6 Drawing Sheets

(56) References Cited

OTHER PUBLICATIONS

"3rd Generation Partnership Project; Technical Specification Group Services and System Aspects; Service requirements for cyber-physical control applications in vertical domains; Stage 1 (Release 18)", 3GPP TS 22.104, V18.3.0, Dec. 2021, pp. 1-101.

"3rd Generation Partnership Project; Technical Specification Group Radio Access Network; Study on NR Positioning Enhancements; (Release 17)", 3GPP TR 38.857, V17.0.0, Mar. 2021, 546.

"New SID on Study on expanded and improved NR positioning", 3GPP TSG RAN Meeting #94e, RP-213561, Agenda Item: 8.6.1, Intel, Dec. 6-17, 2021, 5 pages.

"Error source for NR RAT-dependent positioning", 3GPP TSG-RAN WG1 Meeting #110, R1-2205869, Agenda Item: 9.5.2.1, Huawei, Aug. 22-26, 2022, 7 pages.

"Discussion on solutions for integrity of RAT-dependent positioning", 3GPP TSG RAN WG1 #110, R1-2206047, Agenda Item: 9.5.2.1, vivo, Aug. 22-26, 7 pages.

"Error Sources characterization for integrity of RAT dependent positioning techniques", 3GPP TSG-RAN WG1 #110, R1-2207621, Agenda Item: 9.5.2.1, Ericsson, Aug. 22-26, 2022, pp. 1-7.

"Discussion on integrity for RAT dependent positioning techniques", 3GPP TSG RAN WG1 #110-e, R1-2207088, Agenda Item: 9.5.2.1, InterDigital, Inc., Aug. 22-26, 2022, 11 pages.

"3rd Generation Partnership Project; Technical Specification Group Radio Access Network; NG-RAN; NR Positioning Protocol A (NRPPa) (Release 17)", 3GPP TS 38.455, V17.1.1, Jun. 2022, pp. 1-198.

"Views on solutions for integrity of RAT-dependent positioning techniques", 3GPP TSG RAN WG1 #110bis-e, R1-2208735, Agenda item: 9.5.2.1, Nokia, Oct. 10-19, 2022, 5 pages.

"Views on solutions for integrity of RAT-dependent positioning techniques", 3GPP TSG RAN WG1 #111, R1-2211311, Agenda item: 9.5.2.1, Nokia, Nov. 14-18, 2022, 4 pages.

Extended European Search Report received for corresponding European Patent Application No. 23192150.3, dated Feb. 1, 2024, 8 pages.

* cited by examiner

METHOD FOR DETERMINING POSITIONING INTEGRITY BASED ON SPEED OF LOCATION ESTIMATION

TECHNICAL FIELD

The examples and non-limiting example embodiments relate generally to communications and, more particularly, to a method for determining positioning integrity based on speed of location estimation.

BACKGROUND

It is known to determine a position of a user equipment within a communication network.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
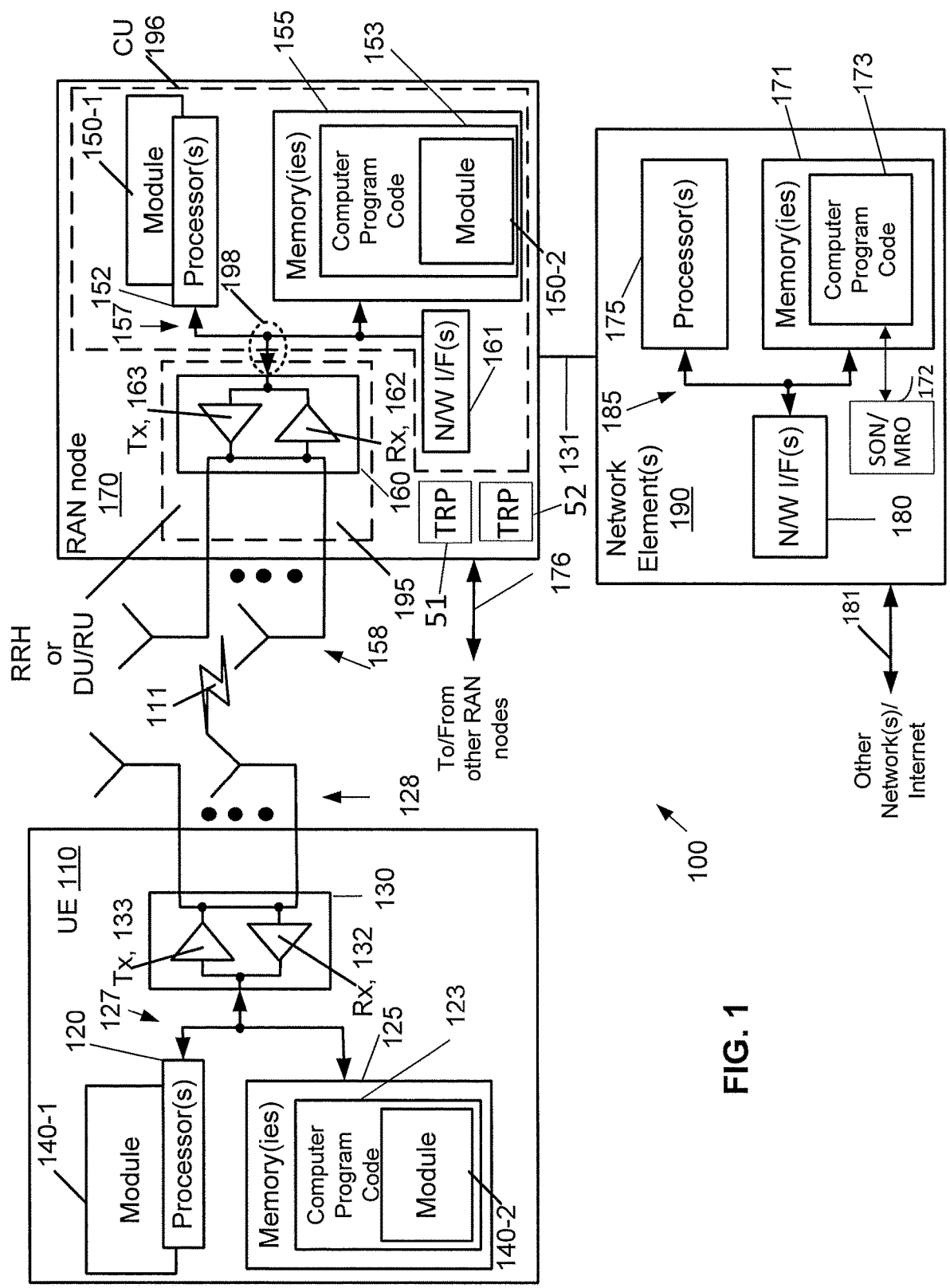
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises two TRPs, TRP 51 and TRP 52. The RAN node 170 may host or comprise other TRPs not shown in FIG. 1.

A relay node in NR is called an integrated access and backhaul node. A mobile termination part of the IAB node facilitates the backhaul (parent link) connection. In other words, it is the functionality which carries UE functionalities. The distributed unit part of the IAB node facilitates the so called access link (child link) connections (i.e. for access link UEs, and backhaul for other IAB nodes, in the case of multi-hop IAB). In other words, it is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein, including a method for determining positioning integrity based on speed of location estimation. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement gNB/TRP related aspects of the examples described herein. Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

The idea of the examples described herein is to determine convergence speed of a positioning algorithm. This could be realized by determining how many iterations, using a certain positioning algorithm, are needed to obtain a position estimate value. As the number of iterations increases, the position estimate becomes more likely more inaccurate. One reason for this could be that the initial guess of the UE's position, used as one input to the algorithm, is closer to the true position in cases where less iterations are needed and farther away in cases where more iterations are required. In addition, in case the initial guess on the UE location is too far away from the true position, the positioning algorithm may not be able to estimate the UE location even with many iterations.

In one embodiment, the UE could report, relative to an average number of iterations (or similar), how many iterations were used to determine the position estimate. This is an indication of a confidence level value for the position estimate. Certain convergence speeds could be mapped to certain confidence levels or intervals. In another example, such confidence level or interval can be directly indicated by the UE to the LMF.

A method includes receiving, from a network element (LMF), an indication indicating the UE to determine convergence speed for a positioning algorithm used in positioning of the UE; performing UE based positioning by performing the positioning algorithm to obtain the positioning result and determining convergence speed associated with the obtained positioning result; indicating the obtained positioning result to the LMF; and indicating the associated convergence speed or at least one value obtained using the associated convergence speed to the LMF.

The associated convergence speed may be relative convergence speed obtained based on convergence speed of the positioning algorithm in obtaining the positioning result and average convergence speed. The average convergence speed may be determined by the UE based on one or more previous positioning algorithm convergence speeds. The average convergence speed may be indicated by the LMF to the UE. The convergence speed may be indicated by a number of positioning algorithm iterations used in obtaining the prediction result.

The reason to use relative convergence speed in an example embodiment is that actual convergence speed may be proprietary information. So, in some examples a modality is that the UE indicates 0/1 if the positioning result is obtained with less or more iterations than some average number. For example, 0 means the low protection level or high integrity risk, while 1 means the high protection level or low integrity risk. These thresholds could be related to some value area. In another example, a soft indication could be used to inform different levels of protection or integrity risk, which could use more bits (e.g. 0.1, 0.2, . . . 1, . . . 1.5, 2.0 . . . }. The protection level is a real-time upper bound on the positioning error at the required degree of confidence, where the degree of confidence is determined by the target integrity risk (TIR) probability. More specifically, the protection level is defined as follows: The PL is a statistical upper-bound of the Positioning Error (PE) that ensures that, the probability per unit of time of the true error being greater than the Alert Limit (AL) and the PL being less than or equal to the AL, for longer than the Time-to-Alert (TTA), is less than the required TIR. AL is the maximum allowable positioning error such that the positioning system is available for the intended application. If the positioning error is beyond the AL, the positioning system should be declared unavailable for the intended application to prevent loss of positioning integrity. TTA is the maximum allowable elapsed time from when the positioning error exceeds the Alert Limit (AL) until the function providing positioning integrity annunciates a corresponding alert.

The LMF may define an average speed, even though the UE indicates the relative convergence speed. The UE may also indicate the actual number of iterations or a similar value. The LMF can define the average speed to the UE when the LMF indicates the UE to use a specific algorithm of location estimation. It may not be possible for the LMF to indicate/configure a specific algorithm for the UE. An embodiment is a "UE-based integrity mode based on UE-based positioning". The UE does not disclose too much information related to the algorithm, and the LMF does not clearly know the information.

Positioning integrity is a measure of the trust in the accuracy of the position-related data and the ability to provide timely warnings based on assistance data provided by the network. The focus in the NR Rel-17 work was on GNSS integrity, and for Rel-18 it is natural to extend this to address other positioning techniques as well as there are relevant integrity aspects of mission critical use cases that rely on positioning estimates and the corresponding uncertainty estimate. Integrity enables applications to make the correct decisions based on the reported position, e.g., when monitoring a robotic arm to decide whether its arm movement are within allowed limits to ensure safety distances to humans and other objects. Thus, position integrity may at least implicitly indicate whether the obtained position estimate or result should be determined to be reliable or unreliable.

During the study on integrity for RAT-dependent positioning techniques, there were identified error sources for positioning techniques, where the identified error sources are measurement errors and assistance data errors.

LMF stands for location management function. LMF-based positioning integrity mode means that the LMF determines integrity results such as protection level of the horizontal positioning accuracy and vertical positioning accuracy, while UE-based positioning integrity mode implies that the UE determines the integrity results.

DL-TDOA, UL-TDOA and multi-RTT positioning techniques utilize timing measurements and in the end, the location estimation algorithm uses a triangulation/trilateration method. For an unknown location/variable of the UE such as (x, y, z), equations can be derived for timing measurements, but the equations are not linear with respect to the variables, so the equations are linearized based on Taylor-series expansion. For a set of equations from multiple measurements, the solution finding is not trivial and there is no closed-form solution. Based on an initial guess on a location of the target UE, the algorithm needs to estimate the exact location through iterative search.

However, the estimated location would be different depending on the initial guess on a location of the target UE, even if the same measurements are inputs for the algorithm. In case the initial guess is closer to the true location, a better estimation can be observed. In case the initial guess is way far from the true location, the location estimation algorithm also shows that it does not converge into a value, and sometimes the algorithm does not find any solution. In addition, the location estimation algorithm performance also depends on the GDoP (geometric dilution of precision) and/or TRP layout. When the positioning performance is evaluated in the indoor factory model, the accuracy of the non-convex UEs is not good as much as that of the convex UEs. In addition to the measurement errors and/or inherent information error in the assistance data, the algorithm-specific issue for the RAT-dependent integrity issue also needs to be considered, and it has not been discussed.

to the following have been considered as error sources: measurement error, TRP location error, inter-TRP synchronization error, TRP/UE timing error, and beam antenna information error for UE based integrity, and it proposed to do modelling of the distribution of ToA (Time of Arrival) and angle measurement error. It was also suggested to model the ToA measurement error as a Gaussian distribution for LoS (line of sight) and NLoS (non-line of sight) separately, and suggested introducing the minimum TRP number for positioning integrity, and the measurement can be seen as available if the available TRP number in the position solver equation is larger than the minimum TRP number. When the UE/LMF is determining the integrity result, the measurement error and assistance data error are critical, but algorithm-specific error is also one of the main factors.

The examples described herein relate to a method for the UE 110 to determine an integrity result for the UE-based positioning integrity mode considering an algorithm-specific method, which is a different approach than the measurement accuracy.

The UE receives the assistance data including downlink PRS (positioning reference signals) and/or UL SRS configuration information by the network in order to estimate the UE location.

The LMF configures rule(s) to determine the integrity result such as horizontal protection level, vertical protection level, and/or achievable target integrity risk, where the rule is about the running time or convergence speed of the localization algorithm. This might be highly dependent on the UE implementation perspective. The inventors have beneficially noticed that algorithm convergence speed may be highly related to the location estimate accuracy. That is, faster algorithm convergence speed increases may be associated with more accurate or reliable location (or position) estimate. In other words, the integrity of location estimate may be deemed to be better for a location estimate that is obtained with a faster algorithm convergence speed than for a location estimate that is obtained with a slower algorithm convergence speed. Thus, the proposed solution enables the LMF to determine which location estimates, provided by UE(s), are more likely to meet one or more location accuracy and/or reliability requirements, and/or the proposed solution enables the LMF to determine the protection level of positioning accuracy for a location estimate.

The LMF indicates to the UE to calculate the "relative" convergence speed of the location estimation algorithm compared to the average convergence speed when it estimates a location of the target UE.

The UE calculates average convergence speed of running algorithm when it estimates the location of the UE. For example, the UE may use a LS (Least Square)-based estimation algorithm as LS provides good performance and does not demand high complexity.

UE-assisted positioning: throughout multiple location estimation for many target UEs, the LMF can decide the average convergence speed. In case that the LMF and the UE use the same algorithm for the location estimation, the LMF can provide the UE with the average convergence speed. UE-assisted positioning is where the positioning estimation is performed by the network. The UE may measure reference signal(s) such as PRS and provide measurement result(s) to the LMF or similar network entity (e.g. location server). The LMF may determine the UE's location estimate based on the received measurement result(s). Location herein may be referred to also as position. Thus, the LMF may determine the position of the UE (or can be referred to as position estimate).

UE-based positioning: The UE may also have a local estimate of the average convergence speed of the algorithm from prior location estimations. An embodiment of the examples described herein is the UE-based positioning for UE-based integrity mode. For example, "N" would be the average number of iterations of the LS estimation algorithm (or in general for any given algorithm). UE-based positioning is where the positioning estimation is performed by the UE itself. In this case, the UE may determine the UE's location estimate itself on the basis of measuring reference signal(s), such as PRS. Similarly as above, the UE may determine position of the UE (or can be referred to as position estimate).

LMF-based integrity decision: The LMF indicates or requests the UE to report the information on the relative convergence speed for each location estimate, and the LMF determines the integrity result from the reported information. For example, the UE can be configured to report one value of $\{0.5, 1, 1.5, 2, \ldots Y\}$. If the UE reports "1", it means the estimator running time was equal to the average running time. If the UE reports a very large number such as Y, it could mean that the running algorithm did not converge. Note that the location estimation is basically based on an iterative algorithm as there is no closed form solution.

UE-based integrity decision: The LMF indicates or requests the UE to report integrity result such as the horizontal protection level, vertical protection level, and/or achievable target integrity risk based on configured threshold(s) for the relative convergence speed of the location estimation algorithm. For example, the LMF configures a rule for reporting protection level based on level of convergence speed compared to the average convergence speed.

If the relative convergence speed of localization estimation algorithm is between N×Z1 and N×Z2, for variables Z1 and Z2, then the UE reports Y1 and Y2 for the horizontal and the vertical protection level for variables Y1 and Y2. Y1 and Y2 may be meters, or they may be percent about the estimated accuracy. For example, the LMF and/or UE can consider 2N as the limit of protection level, as follows:

2×N: The UE reports to the LMF that error exceeds the protection level. It may mean that even if the UE estimated the target UE location, it may not be able to guarantee the accuracy of the estimated location.

0.5×N: The UE reports to the LMF that error does not exceed the protection level (protection level is provided by LMF to the UE)

In another embodiment, the LMF provides a set of relative convergence speed values and their associated values of protection levels. For example, values for the relative convergence speed can be {0.5, 1.00, 1.5, 2.00} and their associated horizontal protection levels are {0.5 m, 1.0 m, 1.5 m, 2.0 m}. If a relative convergence speed for a location estimation is 0.5, the UE may report the horizontal protection level of 0.5 m.

The LMF requests UE to use the same stopping criterion for the location estimation algorithm to estimate the convergence speed. If the UE uses a different stopping criterion for the algorithm, the UE should re-estimate the average convergence speed.

In addition, the LMF can provide a stopping criterion for the location estimation algorithm such that $|X_{update}(i) - X_{update}(i-1)| \leq$ threshold, where $X_{update}(i)$ is an estimated location (x,y,z) at the i-th iteration, and $X_{update}(i-1)$ is an estimated location for coordinates (x,y,z) at the (i-1)-th iteration. That is, it means the estimated value at the previous iteration.

The LMF can indicate the UE to consider specific components when it derives integrity results such as horizontal and vertical protection level. For example, the LMF indicates UE 110 to include or exclude a LoS/NLoS factor, a timing error of a specific TEG (Timing Error Group), or a relative convergence speed of the location estimation algorithm.

The UE may report the integrity results such as horizontal and vertical protection level, and reports which components it considered to derive the integrity results.

Figure 2:
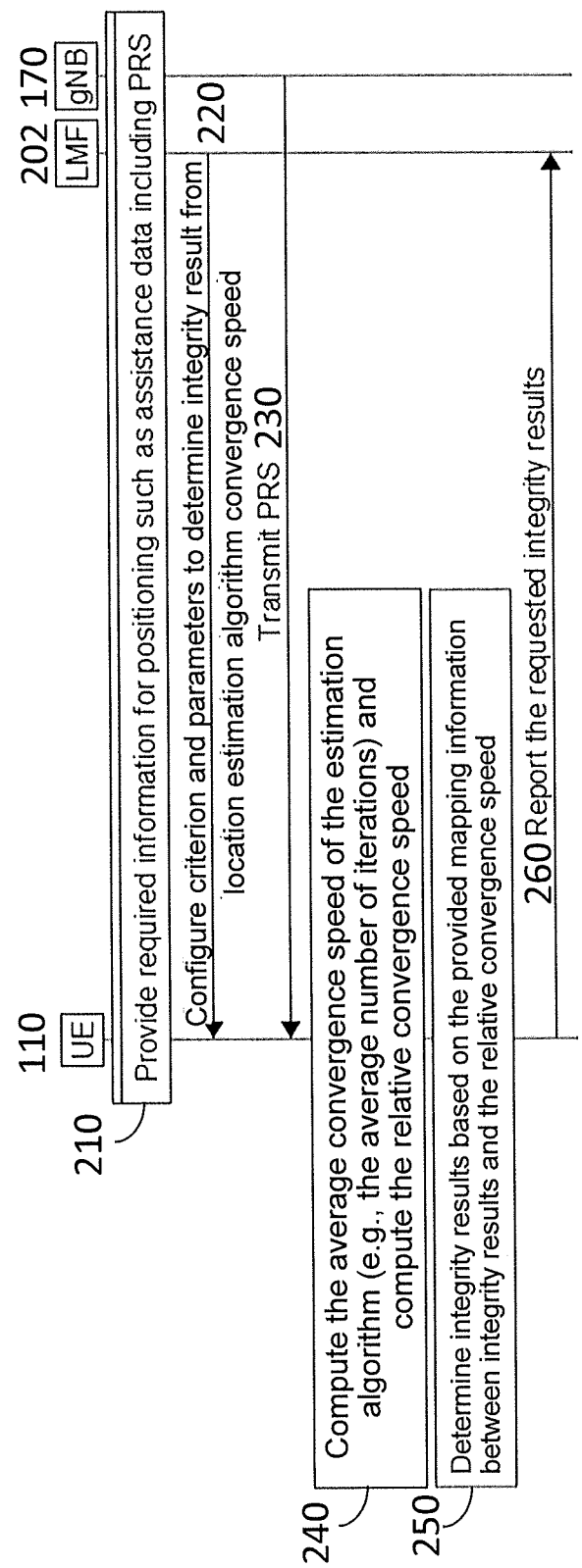
FIG. 2 shows an overall flow chart illustrating the signaling aspects of the examples described herein.

FIG. 2 provides an overall flow chart. At 210, the UE 110, the LMF 202 and the gNB 170 provide information for positioning such as assistance data including PRS. At 220, the LMF 202 transmits to the UE 110 a criterion and parameters to determine an integrity result from location estimation algorithm convergence speed. At 230, the gNB 170 transmits PRS to the UE 110. At 240, the UE 110 computes the average convergence speed of the estimation algorithm (e.g., the average number of iterations) and computes the relative convergence speed. At 250, the UE 110 determines integrity results based on the provided mapping information between integrity results and the relative convergence speed. At 260, the UE 110 reports to the LMF 202 the requested integrity results. In some examples, the LMF 202 may form part of RAN node 170 (the gNB) or the one or more network elements 190. For example, the LMF 202 transmits to the UE 110 a criterion such that the UE 110 should consider LoS indicators for 18 TRPs and relative convergence speed when the UE 110 determines protection level of positioning accuracy. More specifically, the criterion includes that the UE should select TRPs showing more than 0.8 of the LoS indicator, and it may also include that in case the convergence speed of the positioning algorithm to estimate the current location is faster than the average to estimate the UE location, the UE should determine the horizontal protection level as a certain value such as 1 meter. As another example, if the convergence speed of the current location estimation is less than half of the average convergence speed, the UE determines the horizontal protection level as 0.5 meter. The criterion also includes information on the stopping criterion on the location estimation algorithm. An example criterion is that if the estimated location difference between at a certain iteration and the previous iteration of the location estimation algorithm is less than a threshold such as 10^(−3) (meters), the UE should stop the running algorithm. The UE uses the provided threshold to estimate location and compute the average and relative convergence speed. It should be noted that when the UE computes the relative convergence speed for the current location estimation, the used threshold should be the same as a previously used threshold to compute the average convergence speed. The criterion may additionally include a specific number of positioning measurements that should be used for location estimation, as the convergence speed is different according to the number of used measurements.

In some examples, it may not be necessary for the UE 110 to report and/or determine the integrity result to the LMF 202. Instead, the UE 110 may determine relative convergence speed and report the determined relative convergence speed to the LMF 202. For example, relative convergence speed may be determined, by the UE 110, based on average convergence speed and convergence speed of the positioning algorithm used in determining the current position. For instance, relative convergence speed may indicate whether current convergence speed is faster or slower than the average convergence speed. For instance, the relative convergence speed may indicate how much faster or slower the current convergence speed is compared with the average convergence speed.

LMF 202 may then determine based on the relative convergence speed how reliable the determined position estimation of the UE 110 is. As an example, when the relative convergence speed indicates that the convergence speed in determining the position estimate is lower than the average convergence speed, the LMF 202 may determine that the position estimate is reliable or at least more reliable than a position estimate which is associated with relative convergence speed which indicates that the convergence speed in determining the position estimate is higher than the average convergence speed. It is also possible to utilize certain thresholds so that when relative convergence speed indicates that the current convergence speed is within a certain margin from the average convergence speed, the LMF 202 may determine that the associated position estimate is reliable, and that when it is not within certain margin, the position estimate may be determined to be unreliable.

In a further example, the UE 110 may, instead of or in addition to reporting the integrity result and/or relative convergence speed to the LMF 202, report determined convergence speed associated with the position estimate or at least one value obtained based on the determined convergence speed. In some examples, such value may directly indicate determined convergence speed or it may indicate the relative convergence speed. In a further example, the at least one value may indicate a certain value range within which the determined convergence speed or the relative convergence speed is. For instance, value 1 could indicate that convergence speed is between A and B; value 2 could indicate that convergence speed is between B and C; and value 3 could indicate that convergence speed is between C and D. Similarly, in an example, value 1 may indicate that relative convergence speed is lower than or equal to average convergence speed+Y, wherein Y is a margin (≥0) for average convergence speed; and value 2 may indicate that relative convergence speed is above average convergence speed+Y. Thus, if value 1 is indicated, LMF 202 may determine that the position estimate is reliable and if value 2 is indicated, LMF 202 may determine that the position estimate is unreliable. Different values, ranges, and margins may be used. As noted above, UE 110 may determine the value to report based on e.g. the convergence speed or relative convergence speed.

Figure 3:
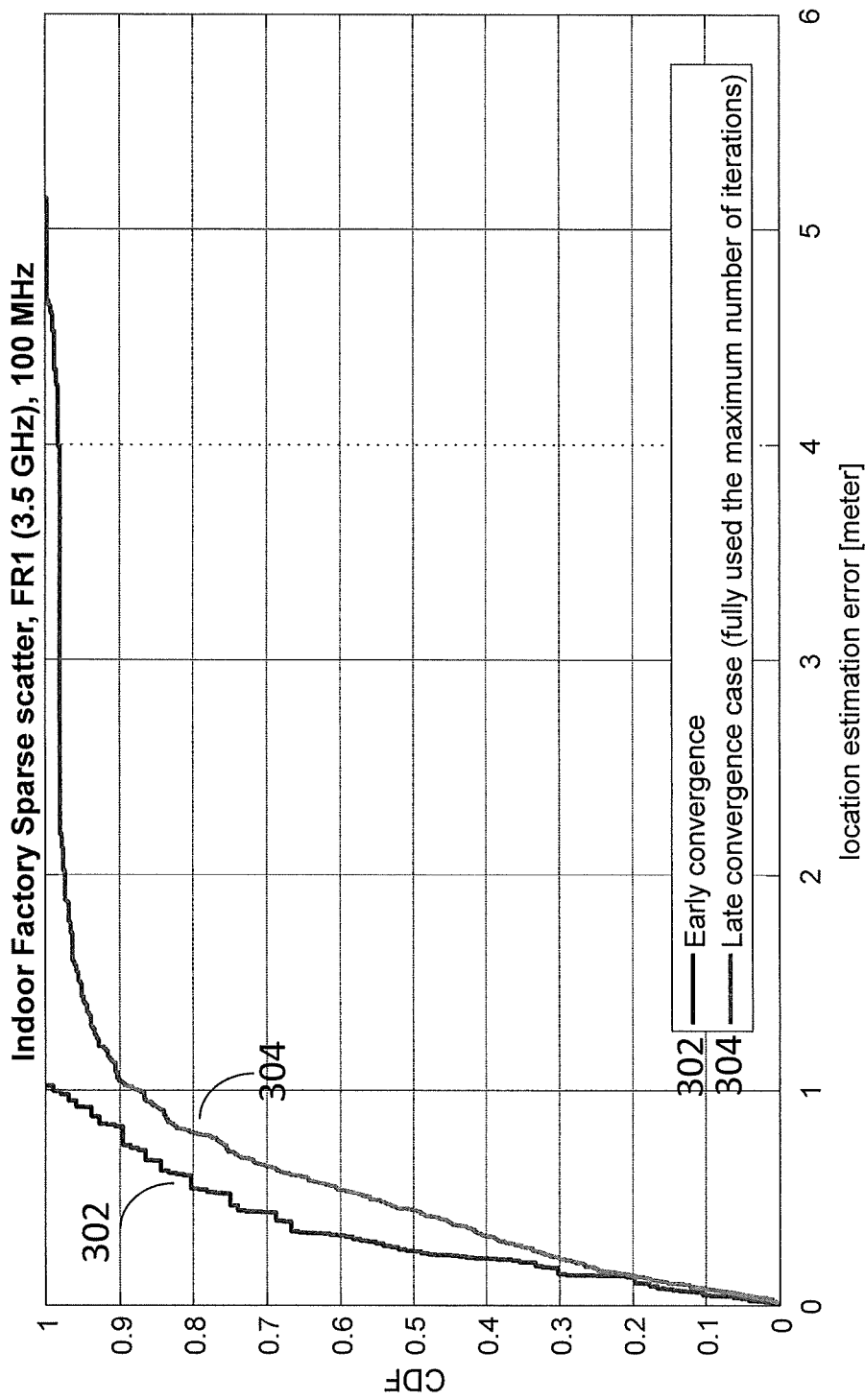
FIG. 3 shows a performance trend depending on the convergence speed of the location estimation algorithm.

Different UEs (e.g., high end or low end) may have different ability to run positioning algorithms with different levels of complexity. So the UE may indicate to the LMF as part of capability signaling the type of algorithms it can run. For example, UE may report:

Capability A1: High complexity, high speed algorithms
Capability A2: High complexity, low speed algorithms
Capability B1: Low complexity, high speed algorithms
Capability B2: Low complexity, low speed algorithms To show the performance difference depending on the convergence speed of the algorithm, FIG. 3 provides an evaluation result of positioning accuracy from CP positioning. In particular, FIG. 3 shows the performance trend depending on the convergence speed of the location estimation algorithm.

The commonly used method might be the LS (least square) estimation algorithm including variation of the LS estimation method from Chan's method. Usually, CP positioning provides better performance than what is shown in FIG. 3, but FIG. 3 provides justification of the proposal of the examples described herein rather than the performance of CP positioning. For this purpose, the stopping criterion is set on the location estimation algorithm as $|X_{update}(i)-X_{update}(i-1)| \leq 0.01$. The maximum number of iterations is set up as 500. To get a better performance, a more strict threshold value such as 0.001 may be used rather than 0.01 and the maximum number of iterations should be increased. However, it should be noted that how much performance that could be achieved is not the main embodiment of the examples described herein.

The convergence speed is highly related to the location estimation accuracy. In the simulation, the algorithm used the maximum number of iterations (that is, 500) in most cases. For this case, this is considered as the low convergence speed case, and the performance is shown in plot 304.

On the other hand, there are cases where the location estimation algorithm does not need the maximum number of iterations. That is, the estimation algorithm stopped the iteration loop with less than 300. In this case, plot 302 shows the accuracy performance. An intuitive example to describe this result is that if the estimation algorithm has a better initial guess, the convergence speed is relatively fast.

Figure 4:
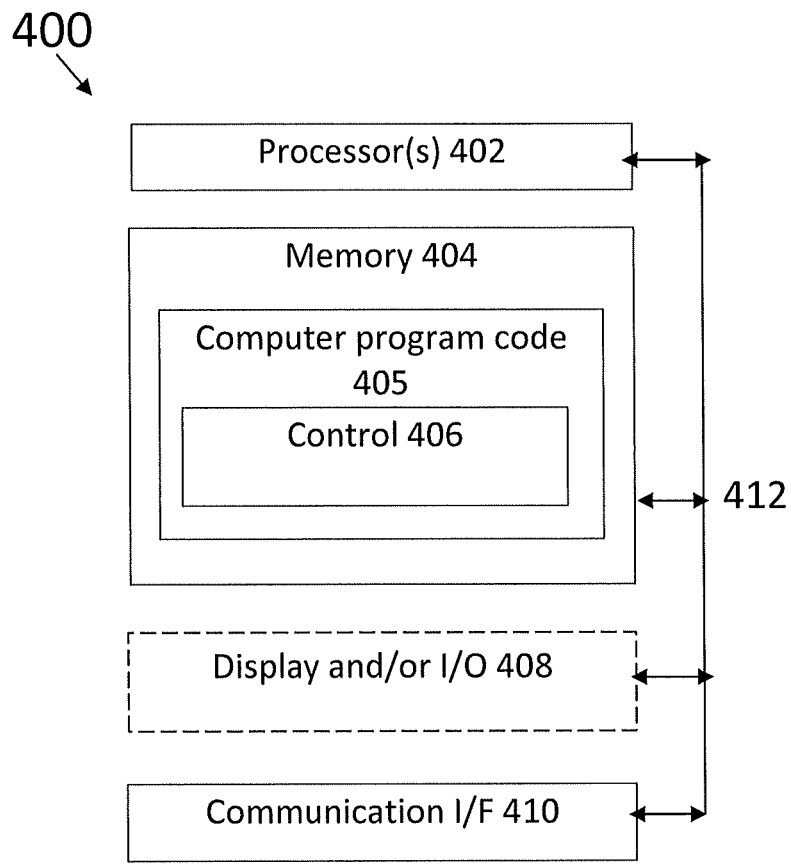
FIG. 4 is an example apparatus configured to implement the examples described herein.

In addition, the tail probability is critical for the integrity result, as it would be the integrity risk. FIG. 4 shows that depending on the convergence speed, there is a big difference on the integrity risk.

FIG. 4 is an example apparatus 400, which may be implemented in hardware, configured to implement the examples described herein. The apparatus 400 comprises at least one processor 402 (e.g. an FPGA and/or CPU), at least one memory 404 including computer program code 405, wherein the at least one memory 404 and the computer program code 405 are configured to, with the at least one processor 402, cause the apparatus 400 to implement circuitry, a process, component, module, or function (collectively control 406) to implement the examples described herein, including a method for determining positioning integrity based on speed of location estimation. The memory 404 may be a non-transitory memory, a transitory memory, a volatile memory (e.g. RAM), or a non-volatile memory (e.g. ROM).

The apparatus 400 optionally includes a display and/or I/O interface 408 that may be used to display aspects or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 400 includes one or more communication e.g. network (N/W) interfaces (I/F(s)) 410. The communication I/F(s) 410 may be wired and/or wireless and communicate over the Internet/other network(s) via any communication technique. The communication I/F(s) 410 may comprise one or more transmitters and one or more receivers. The communication I/F(s) 410 may comprise standard well-known components such as an amplifier, filter, frequency-converter, (de)modulator, and encoder/decoder circuitries and one or more antennas.

The apparatus 400 to implement the functionality of control 406 may be UE 110, RAN node 170 (e.g. gNB), or network element(s) 190. Thus, processor 402 may correspond to processor(s) 120, processor(s) 152 and/or processor(s) 175, memory 404 may correspond to memory(ies) 125, memory(ies) 155 and/or memory(ies) 171, computer program code 405 may correspond to computer program code 123, module 140-1, module 140-2, and/or computer program code 153, module 150-1, module 150-2, and/or computer program code 173, and communication I/F(s) 410 may correspond to transceiver 130, antenna(s) 128, transceiver 160, antenna(s) 158, N/W I/F(s) 161, and/or N/W I/F(s) 180. Alternatively, apparatus 400 may not correspond to either of UE 110, RAN node 170, or network element(s) 190, as apparatus 400 may be part of a self-organizing/optimizing network (SON) node, such as in a cloud.

The apparatus 400 may also be distributed throughout the network (e.g. 100) including within and between apparatus 400 and any network element (such as a network control element (NCE) 190 and/or the RAN node 170 and/or the UE 110).

Interface 412 enables data communication between the various items of apparatus 400, as shown in FIG. 4. For example, the interface 412 may be one or more buses such as address, data, or control buses, and may include any interconnection mechanism, such as a series of lines on a motherboard or integrated circuit, fiber optics or other optical communication equipment, and the like. Computer program code 405, including control 406 may comprise object-oriented software configured to pass data or messages between objects within computer program code 405. The apparatus 400 need not comprise each of the features mentioned, or may comprise other features as well.

Figure 5:
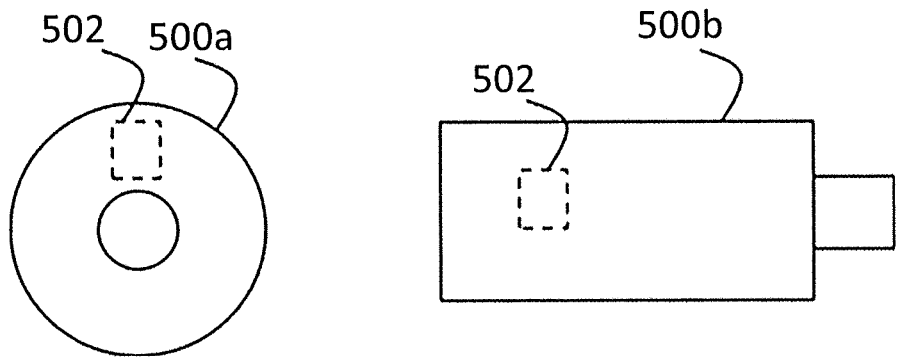
FIG. 5 shows a representation of an example of non-volatile memory media.

FIG. 5 shows a schematic representation of non-volatile memory media 500*a* (e.g. computer disc (CD) or digital versatile disc (DVD)) and 500*b* (e.g. universal serial bus (USB) memory stick) storing instructions and/or parameters 502 which when executed by a processor allows the processor to perform one or more of the steps of the methods described herein.

Figure 6:
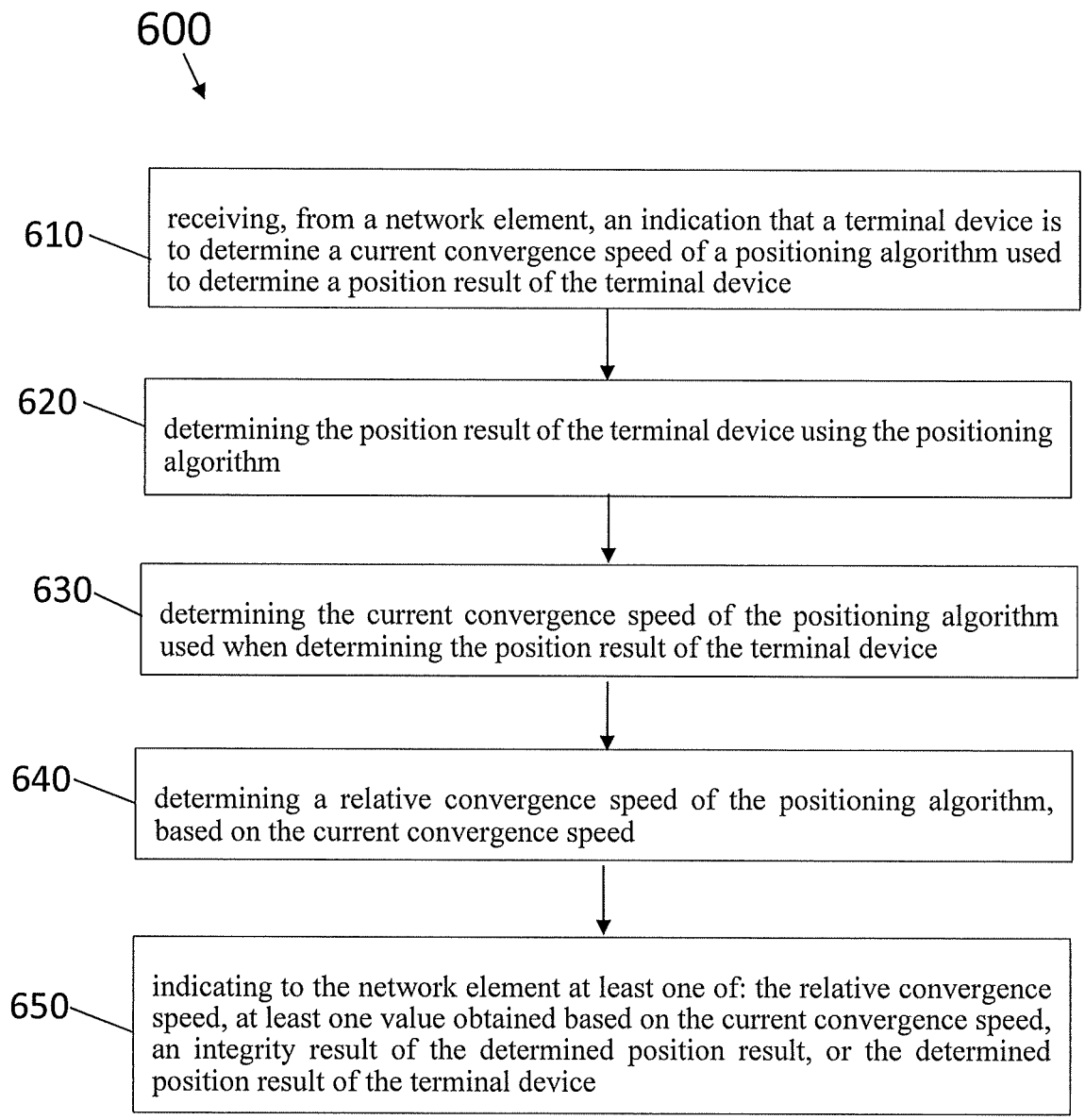
FIG. 6 is an example method implementing the examples described herein.

FIG. 6 is an example method 600 to implement the example embodiments described herein. At 610, the method includes receiving, from a network element, an indication that a terminal device is to determine a current convergence speed of a positioning algorithm used to determine a position result of the terminal device. At 620, the method includes determining the position result of the terminal device using the positioning algorithm. At 630, the method includes determining the current convergence speed of the positioning algorithm used when determining the position result of the terminal device. At 640, the method includes determining a relative convergence speed of the positioning algorithm, based on the current convergence speed. At 650, the method includes indicating to the network element at least one of: the relative convergence speed, at least one value obtained based on the current convergence speed, an integrity result of the determined position result, or the determined position result of the terminal device. Method 600 may be performed with UE 110.

In an example embodiment, the receiving step 610 is optional. That is, for example, the UE 110 may be pre-configured to determine current or actual convergence speed of the positioning algorithm, or the indication to determine current or actual convergence speed could be received from some other network element. In another example embodiment, the indication of step 610 is to indicate that the UE 110 is to determine the relative convergence speed and/or the integrity result. Hence, for example, it may indirectly indicate the UE 110 to determine the current convergence speed, for example, to determine the relative convergence speed. In an example, the indication of step 610 may request the UE 110 to provide the relative convergence speed and/or the integrity result to the network (e.g. to LMF 202).

Figure 7:
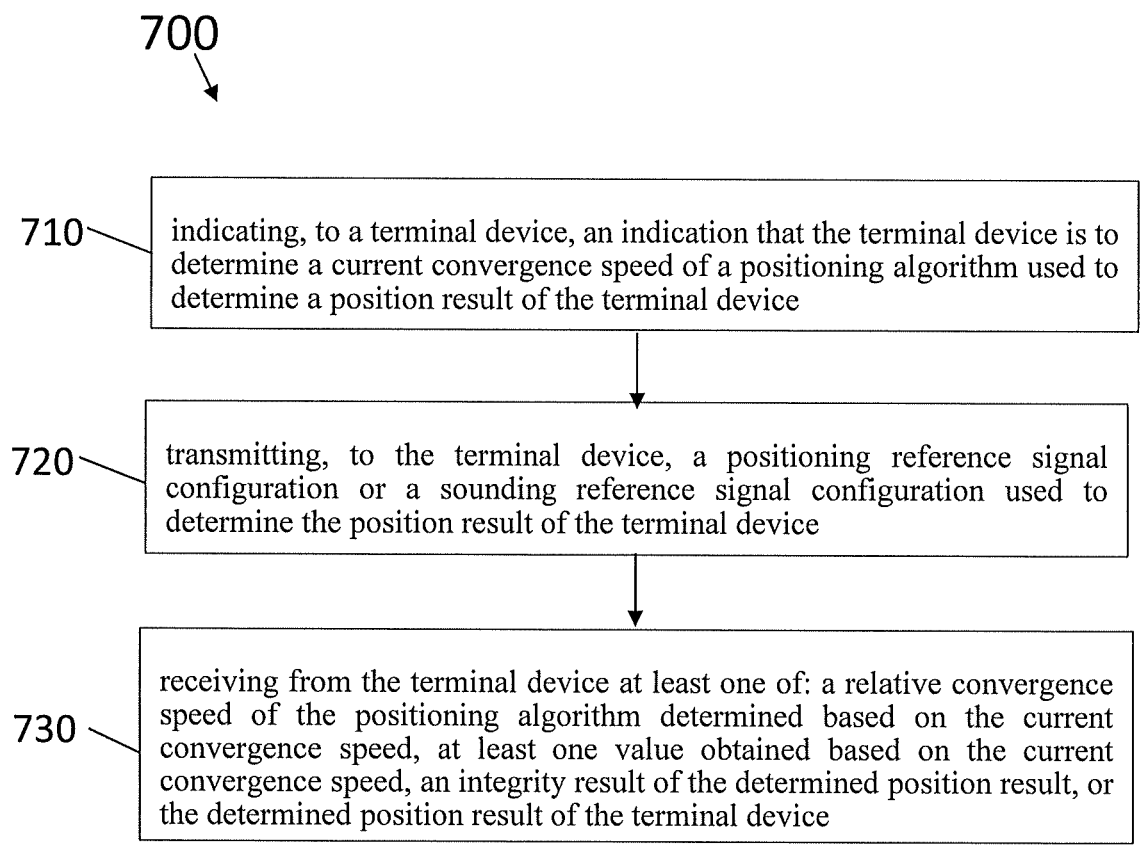
FIG. 7 is an example method implementing the examples described herein.

FIG. 7 is an example method 700 to implement the example embodiments described herein. At 710, the method includes indicating, to a terminal device, an indication that the terminal device is to determine a current convergence speed of a positioning algorithm used to determine a position result of the terminal device. At 720, the method includes transmitting, to the terminal device, a positioning reference signal configuration or a sounding reference signal configuration used to determine the position result of the terminal device. At 730, the method includes receiving from the terminal device at least one of: a relative convergence speed of the positioning algorithm determined based on the current convergence speed, at least one value obtained based on the current convergence speed, an integrity result of the determined position result, or the determined position result of the terminal device. Method 700 may be performed with RAN node 170, one or more network elements 190, or LMF 202.

In an example embodiment, the indicating (e.g. transmitting) step 710 is optional. That is, for example, the UE 110 may be pre-configured to determine current or actual convergence speed of the positioning algorithm. In another example embodiment, the indication of step 710 is to indicate to the UE 110 that the UE 110 is to determine the relative convergence speed and/or the integrity result. Hence, for example, it may indirectly indicate the UE 110 to determine the current convergence speed, for example, to determine the relative convergence speed. In an example, the indication of step 710 may request the UE 110 to provide the relative convergence speed and/or the integrity result to the network (e.g. to LMF 202).

The following examples are provided and described herein.

Example 1

An apparatus includes at least one processor; and at least one memory storing instructions when executed by the at least one processor, cause the apparatus at least to: receive, from a network element, an indication that a terminal device is to determine a current convergence speed of a positioning algorithm used to determine a position result of the terminal device; determine the position result of the terminal device using the positioning algorithm; determine the current convergence speed of the positioning algorithm used when determining the position result of the terminal device; determine a relative convergence speed of the positioning algorithm, based on the current convergence speed; and indicate to the network element at least one of: the relative convergence speed, at least one value obtained based on the current convergence speed, an integrity result of the determined position result, or the determined position result of the terminal device.

Example 2

The apparatus of example 1, wherein the apparatus includes the terminal device.

Example 3

The apparatus of any of examples 1 to 2, wherein the apparatus is caused to: determine the integrity result of the determined position result, at least based on the current convergence speed of the positioning algorithm or the relative convergence speed of the positioning algorithm.

Example 4

The apparatus of example 3, wherein the apparatus is caused to: indicate, to the network element, the determined integrity result of the determined position result.

Example 5

The apparatus of any of examples 1 to 4, wherein the apparatus is further caused to: receive, from the network element, at least one criterion used to determine the integrity result of the determined position result at least based on the current convergence speed of the positioning algorithm or the relative convergence speed of the positioning algorithm; determine the integrity result of the determined position result, based on the at least one criterion, and based on the current convergence speed of the positioning algorithm or the relative convergence speed of the positioning algorithm.

Example 6

The apparatus of example 5, wherein the at least one criterion includes at least one of: line of sight impact; non-line of sight impact; a timing error group; or the relative convergence speed of the location estimation algorithm.

Example 7

The apparatus of any of examples 1 to 6, wherein the current convergence speed of the positioning algorithm includes: a number of iterations used with the positioning algorithm to determine the position result of the terminal device; or a running time of the positioning algorithm.

Example 8

The apparatus of any of examples 1 to 7, wherein the relative convergence speed is further determined based on an average convergence speed of the positioning algorithm.

Example 9

The apparatus of example 8, wherein the apparatus is caused to: determine the average convergence speed based on one or more previous positioning algorithm convergence speeds; or receive, from the network element, the average convergence speed of the positioning algorithm.

Example 10

The apparatus of any of examples 1 to 9, wherein the apparatus is caused to: determine, based on the current convergence speed, a confidence level associated with the determined position result or a confidence interval associated with the determined position result.

Example 11

The apparatus of example 10, wherein the apparatus is caused to: indicate, to the network element, the confidence level or confidence interval.

Example 12

The apparatus of any of examples 1 to 11, wherein the integrity result of the determined position result includes at least one of: a protection level, the protection level including a horizontal protection level, a vertical protection level, or an achievable target integrity risk.

Example 13

The apparatus of example 12, wherein the apparatus is caused to: receive, from the network element, a mapping between the relative convergence speed and the protection level; and indicate, to the network element, the integrity result based on the received mapping.

Example 14

The apparatus of any of examples 1 to 13, wherein the apparatus is further caused to: receive, from the network element, a stopping criterion for the positioning algorithm; and determine the relative convergence speed of the positioning algorithm, based on the stopping criterion.

Example 15

The apparatus of any of examples 1 to 14, wherein the apparatus is caused to: indicate, to the network element, a capability of the terminal device, the capability including at least one of a complexity of the positioning algorithm or a speed of the positioning algorithm.

Example 16

The apparatus of any of examples 1 to 15, wherein the network element includes a location management function.

Example 17

The apparatus of any of examples 1 to 16, wherein the relative convergence speed indicates whether the current convergence speed is faster or slower than an average convergence speed.

Example 18

The apparatus of any of examples 1 to 17, wherein the relative convergence speed indicates how much faster or slower the current convergence speed is compared with an average convergence speed.

Example 19

The apparatus of any of examples 1 to 18, wherein the apparatus is caused to: determine that the position result is reliable when the relative convergence speed indicates that the current convergence speed in determining the position estimate is lower than an average convergence speed; or determine that the position result is more reliable than a position estimate which is associated with relative convergence speed which indicates that the current convergence speed in determining the position estimate is higher than the average convergence speed.

Example 20

The apparatus of any of examples 1 to 19, wherein the apparatus is caused to: determine that the position result is reliable when the relative convergence speed indicates that the current convergence speed is within a margin from an average convergence speed; and determine that the position result is unreliable when the relative convergence speed indicates that the current convergence speed is not within the margin from the average convergence speed.

Example 21

The apparatus of any of examples 1 to 20, wherein the at least one value includes the current convergence speed.

Example 22

The apparatus of any of examples 1 to 21, wherein the at least one value obtained based on the current convergence speed includes: a range within which the current convergence speed is; or a range within which the relative convergence speed is.

Example 23

The apparatus of any of examples 1 to 22, wherein the at least one value includes a set of values, wherein a value of the set of values is associated with a range within which the current convergence speed is or within which the relative convergence speed is.

Example 24

The apparatus of any of examples 1 to 23, wherein the at least one value includes a set of values, wherein a first value of the set of values indicates that the relative convergence speed is lower than or equal to an average convergence speed added to a margin, the margin being greater than or equal to zero, and wherein a second value of the set of values indicates that the relative convergence speed is greater than the average convergence speed added to the margin.

Example 25

The apparatus of example 24, wherein the first value is configured to be used to determine that the position result is reliable, and the second value is configured to be used to determine that the position result is unreliable.

Example 26

The apparatus of any of examples 1 to 25, wherein the position result is determined to be reliable when the relative convergence speed is above or below a threshold.

Example 27

The apparatus of any of examples 1 to 26, wherein the position result is determined to be reliable when the current convergence speed is below a threshold, or the position result is determined to be unreliable when the current convergence speed is above the threshold.

Example 28

An apparatus includes at least one processor; and at least one processor; and at least one memory storing instructions when executed by the at least one processor, cause the apparatus at least to: indicate, to a terminal device, an indication that the terminal device is to determine a current convergence speed of a positioning algorithm used to determine a position result of the terminal device; transmit, to the terminal device, a positioning reference signal configuration or a sounding reference signal configuration used to determine the position result of the terminal device; and receive from the terminal device at least one of: a relative convergence speed of the positioning algorithm determined based on the current convergence speed, at least one value obtained based on the current convergence speed, an integrity result of the determined position result, or the determined position result of the terminal device.

Example 29

The apparatus of example 28, wherein the apparatus is further caused to: indicate, to the terminal device, at least one criterion used to determine the integrity result of the determined position result at least based on the current convergence speed of the positioning algorithm or the relative convergence speed of the positioning algorithm; and receive, from the terminal device, the integrity result of the position result determined based on the at least one criterion and on the current convergence speed of the positioning algorithm or the relative convergence speed of the positioning algorithm.

Example 30

The apparatus of example 29, wherein the at least one criterion includes at least one of: line of sight impact; non-line of sight impact; a timing error group; or the relative convergence speed of the location estimation algorithm.

Example 31

The apparatus of any of examples 28 to 30, wherein the apparatus is further caused to: determine the integrity result of the determined position result, based on the relative convergence speed of the positioning algorithm, the current convergence speed of the positioning algorithm, or the at least one value obtained based on the current convergence speed.

Example 32

The apparatus of any of examples 28 to 31, wherein current convergence speed of the positioning algorithm includes: a number of iterations used with the positioning algorithm to determine the position result of the terminal device; or a running time of the positioning algorithm.

Example 33

The apparatus of any of examples 28 to 32, wherein the relative convergence speed is determined based on an average convergence speed of the positioning algorithm.

Example 34

The apparatus of example 33, wherein the apparatus is caused to: transmit, to the terminal device, the average convergence speed of the positioning algorithm.

Example 35

The apparatus of any of examples 28 to 34, wherein the apparatus is caused to: receive, from the terminal device, a confidence level associated with the determined position result or a confidence interval associated with the determined position result.

Example 36

The apparatus of any of examples 28 to 35, wherein the integrity result of the determined position result includes at least one of: a protection level, the protection level including a horizontal protection level, a vertical protection level, or an achievable target integrity risk.

Example 37

The apparatus of example 36, wherein the apparatus is caused to: transmit, to the terminal device, a mapping between the relative convergence speed and the protection level; and receive, from the terminal device, the integrity result based on the received mapping.

Example 38

The apparatus of any of examples 28 to 37, wherein the apparatus is further caused to: transmit, to the terminal device, a stopping criterion for the positioning algorithm; and wherein the stopping criterion is configured to be used to determine the relative convergence speed of the positioning algorithm.

Example 39

The apparatus of any of examples 28 to 38, wherein the apparatus is caused to: receive, from the terminal device, a capability of the terminal device, the capability including at least one of a complexity of the positioning algorithm or a speed of the positioning algorithm.

Example 40

The apparatus of any of examples 28 to 39, wherein the apparatus includes a location management function.

Example 41

The apparatus of any of examples 28 to 40, wherein the relative convergence speed indicates whether the current convergence speed is faster or slower than an average convergence speed.

Example 42

The apparatus of any of examples 28 to 41, wherein the relative convergence speed indicates how much faster or slower the current convergence speed is compared with an average convergence speed.

Example 43

The apparatus of any of examples 28 to 42, wherein the apparatus is caused to: determine that the position result is reliable when the relative convergence speed indicates that the current convergence speed in determining the position estimate is lower than an average convergence speed; or determine that the position result is more reliable than a position estimate which is associated with relative convergence speed which indicates that the current convergence speed in determining the position estimate is higher than the average convergence speed.

Example 44

The apparatus of any of examples 28 to 43, wherein the apparatus is caused to: determine that the position result is reliable when the relative convergence speed indicates that the current convergence speed is within a margin from an average convergence speed; and determine that the position result is unreliable when the relative convergence speed indicates that the current convergence speed is not within the margin from the average convergence speed.

Example 45

The apparatus of any of examples 28 to 44, wherein the at least one value includes the current convergence speed.

Example 46

The apparatus of any of examples 28 to 45, wherein the at least one value obtained based on the current convergence speed includes: a range within which the current convergence speed is; or a range within which the relative convergence speed is.

Example 47

The apparatus of any of examples 28 to 46, wherein the at least one value includes a set of values, wherein a value of the set of values is associated with a range within which the current convergence speed is or within which the relative convergence speed is.

Example 48

The apparatus of any of examples 28 to 47, wherein the at least one value includes a set of values, wherein a first value of the set of values indicates that the relative convergence speed is lower than or equal to an average convergence speed added to a margin, the margin being greater than or equal to zero, and wherein a second value of the set of values indicates that the relative convergence speed is greater than the average convergence speed added to the margin.

Example 49

The apparatus of example 48, wherein the first value is configured to be used to determine that the position result is reliable, and the second value is configured to be used to determine that the position result is unreliable.

Example 50

The apparatus of any of examples 28 to 49, wherein the position result is determined to be reliable when the relative convergence speed is above or below a threshold.

Example 51

The apparatus of any of examples 28 to 50, wherein the position result is determined to be reliable when the current convergence speed is below a threshold, or the position result is determined to be unreliable when the current convergence speed is above the threshold.

Example 52

The apparatus of example 1 or example 28, wherein the at least one value includes a set of values, wherein a first value of the set of values indicates that the relative convergence speed is lower than or equal to an average convergence speed, and wherein a second value of the set of values indicates that the relative convergence speed is greater than the average convergence speed, wherein the first value is configured to be used to determine that the position result is reliable, and the second value is configured to be used to determine that the position result is unreliable.

Example 53

A method includes receiving, from a network element, an indication that a terminal device is to determine a current convergence speed of a positioning algorithm used to determine a position result of the terminal device; determining the position result of the terminal device using the positioning algorithm; determining the current convergence speed of the positioning algorithm used when determining the position result of the terminal device; determining a relative convergence speed of the positioning algorithm, based on the current convergence speed; and indicating to the network element at least one of: the relative convergence speed, at least one value obtained based on the current convergence speed, an integrity result of the determined position result, or the determined position result of the terminal device.

Example 54

A method includes indicating, to a terminal device, an indication that the terminal device is to determine a current convergence speed of a positioning algorithm used to determine a position result of the terminal device; transmitting, to the terminal device, a positioning reference signal configuration or a sounding reference signal configuration used to determine the position result of the terminal device; and receiving from the terminal device at least one of: a relative convergence speed of the positioning algorithm determined based on the current convergence speed, at least one value obtained based on the current convergence speed, an integrity result of the determined position result, or the determined position result of the terminal device.

Example 55

An apparatus includes means for receiving, from a network element, an indication that a terminal device is to determine a current convergence speed of a positioning algorithm used to determine a position result of the terminal device; means for determining the position result of the terminal device using the positioning algorithm; means for determining the current convergence speed of the positioning algorithm used when determining the position result of the terminal device; means for determining a relative convergence speed of the positioning algorithm, based on the current convergence speed; and means for indicating to the network element at least one of: the relative convergence speed, at least one value obtained based on the current convergence speed, an integrity result of the determined position result, or the determined position result of the terminal device.

Example 56

An apparatus includes means for indicating, to a terminal device, an indication that the terminal device is to determine a current convergence speed of a positioning algorithm used to determine a position result of the terminal device; means for transmitting, to the terminal device, a positioning reference signal configuration or a sounding reference signal configuration used to determine the position result of the terminal device; and means for receiving from the terminal device at least one of: a relative convergence speed of the positioning algorithm determined based on the current convergence speed, at least one value obtained based on the current convergence speed, an integrity result of the determined position result, or the determined position result of the terminal device.

Example 57

A non-transitory program storage device readable by a machine, tangibly embodying a program of instructions executable with the machine for performing operations, the operations including: receiving, from a network element, an indication that a terminal device is to determine a current convergence speed of a positioning algorithm used to determine a position result of the terminal device; determining the position result of the terminal device using the positioning algorithm; determining the current convergence speed of the positioning algorithm used when determining the position result of the terminal device; determining a relative convergence speed of the positioning algorithm, based on the current convergence speed; and indicating to the network element at least one of: the relative convergence speed, at least one value obtained based on the current convergence speed, an integrity result of the determined position result, or the determined position result of the terminal device.

Example 58

A non-transitory program storage device readable by a machine, tangibly embodying a program of instructions executable with the machine for performing operations, the operations including: indicating, to a terminal device, an indication that the terminal device is to determine a current convergence speed of a positioning algorithm used to determine a position result of the terminal device; transmitting, to the terminal device, a positioning reference signal configuration or a sounding reference signal configuration used to determine the position result of the terminal device; and receiving from the terminal device at least one of: a relative convergence speed of the positioning algorithm determined based on the current convergence speed, at least one value obtained based on the current convergence speed, an integrity result of the determined position result, or the determined position result of the terminal device.

Example 59

The apparatus of example 6, wherein the apparatus is caused to: select at least one transmission reception point having a line of sight impact greater than a threshold, wherein the at least one transmission reception point is used with the terminal device to determine the position result or the integrity result of the determined position result.

Example 60

The apparatus of example 30, wherein at least one transmission reception point having a line of sight impact greater than a threshold is selected and used with the terminal device to determine the position result or the integrity result of the determined position result.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In the figures, arrows between individual blocks represent operational couplings there-between as well as the direction of data flows on those couplings.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are defined as follows (the abbreviations and acronyms may be appended with each other or with other characters using e.g. a dash, hyphen, or number):

3GPP third generation partnership project
4G fourth generation
5G fifth generation
5GC 5G core network
AL alert limit
AMF access and mobility management function
AoA angle of arrival
AoD angle of departure
ARP antenna reference point
ASIC application-specific integrated circuit
CDF cumulative distribution function
CP carrier-phase
CU central processing unit
CU central unit or centralized unit
DL downlink
DSP digital signal processor
eNB evolved Node B (e.g., an LTE base station)
EN-DC E-UTRAN new radio-dual connectivity
en-gNB node providing NR user plane and control plane protocol terminations towards the UE, and acting as a secondary node in EN-DC
E-UTRA evolved universal terrestrial radio access, i.e., the LTE radio access technology
E-UTRAN E-UTRA network
F1 interface between the CU and the DU
PBS for further study
FPGA field-programmable gate array
GCS global coordinate system
GDoP geometric dilution of precision
gNB base station for 5G/NR, i.e., a node providing NR user plane and control plane protocol terminations towards the UE, and connected via the NG interface to the 5GC
GNSS global navigation satellite system
IAB integrated access and backhaul
OF interface
Info information
I/O input/output
LCS local coordinate system
LMF location management function
LoS line of sight
LPHAP low power high accuracy positioning
LS least square
LTE long term evolution (4G)
MAC medium access control
MME mobility management entity
MRO mobility robustness optimization
NCE network control element
NLoS non-line of sight
ng or NG new generation
ng-eNB new generation eNB
NG-RAN new generation radio access network
NR new radio (5G)
NAY network
PDA personal digital assistant
PDCP packet data convergence protocol
PE positioning error
PHY physical layer
PL protection level
PRS positioning reference signal
R1 RAN technical document
RAM random access memory
RAN radio access network
RAN1 radio layer 1
RAN2 radio layer 2
RAN4 radio layer 4
RAT radio access technology
RedCap reduced capability
Rel—release
RLC radio link control
ROM read-only memory
RP RAN meeting
RRC radio resource control (protocol)
RSTD reference signal time difference
RTD relative time difference
RTOA relative time of arrival
RTT round trip time
RU radio unit
Rx receiver or reception
SA system aspects
SA1 3GPP TSG SA WG1
SGW serving gateway
SID study item description
SMF session management function
SON self-organizing/optimizing network
SRS sounding reference signal
TDOA time difference of arrival
TEG timing error group
TIR target integrity risk
ToA time of arrival
TR technical report
TRP transmission reception point
TS technical specification
TSG technical specification group
TTA time-to-alert
Tx transmitter or transmission
UAV unmanned aerial vehicle
UE user equipment (e.g., a wireless, typically mobile device)
UL uplink
UPF user plane function
WG working group
X2 network interface between RAN nodes and between RAN and the core network
Xn network interface between NG-RAN nodes
ZoA zenith angle of arrival

What is claimed is:

1. An apparatus comprising:
at least one processor; and
at least one memory storing instructions which, when executed by the at least one processor,
cause the apparatus at least to perform the following operations:

receiving, from a location management function (LMF), an indication that a terminal device is to determine a current convergence speed of a positioning algorithm used to determine a position result of the terminal device;

determining the position result of the terminal device using the positioning algorithm, the positioning algorithm being a least-squares estimation algorithm that applies a Taylor-series expansion to linearize downlink time-difference-of-arrival, the estimation relying on downlink positioning reference signals transmitted by eighteen transmission reception points wherein each of the transmission reception points having a line-of-sight indicator greater than 0.8, and wherein the least-squares estimation algorithm terminates based on terminating condition when a first one of the following occurs: a difference between a newly estimated location and an immediately prior estimated location is less than 0.001 of a meter, or when 500 iterations are reached;

determining the current convergence speed of the positioning algorithm used when determining the position result of the terminal device, the current convergence speed being defined as the number of iterations that were executed before the terminating condition was satisfied;

determining a relative convergence speed of the positioning algorithm based on the current convergence speed, the relative convergence speed being calculated by dividing the current number of iterations by an average number of iterations that was provided by the LMF for a same stopping condition and for the same set of positioning reference signals and transmission reception points; and indicating to the LMF:
  (i) the relative convergence speed expressed as one of the discrete values 0.5 when the calculated ratio is less than one-half, 1 when the calculated ratio is between one-half and one, 1.5 when the calculated ratio is between one and one-and-a-half, or 2 when the calculated ratio is greater than one-and-a-half;
  (ii) a horizontal protection level equal to 1 meter when the relative convergence speed is less than or equal to 1, and an integrity result of unreliable when the relative convergence speed is greater than or equal to 2; and
  (iii) the determined position result of the terminal device, wherein the apparatus is the terminal device.

2. The apparatus of claim 1, wherein the least-squares estimation algorithm is Chan's variation of least-squares applied to downlink time-difference-of-arrival equations.

3. The apparatus of claim 2, wherein the apparatus is further configured to report both the calculated relative convergence speed and the actual number of iterations executed before the terminating condition was satisfied.

4. The apparatus of claim 3, wherein the average number of iterations used for the relative convergence speed calculation is periodically re-estimated by the terminal device based on a plurality of prior position estimations.

5. The apparatus of claim 4, wherein the apparatus is further configured to map the calculated relative convergence speed to a protection level based on a table received from the LMF, the table associating specific relative convergence speed values with horizontal protection level distances in meters.

6. The apparatus of claim 5, wherein the apparatus is further configured to apply a line-of-sight selection rule requiring use only of transmission reception points having a line-of-sight indicator greater than 0.8 when determining the position result and the relative convergence speed.

7. The apparatus of claim 6, wherein the apparatus is further configured to indicate to the location management function both the determined horizontal protection level and an identification of whether line-of-sight indicators, timing error groups, or relative convergence speed values were considered in deriving the protection level.

8. A system comprising:
a terminal device;
at least one processor; and
at least one memory storing instructions which, when executed by the at least one processor, cause the terminal device at least to perform the following operations:

receiving, from a location management function (LMF), an indication that the terminal device is to determine a current convergence speed of a positioning algorithm used to determine a position result of the terminal device;

determining the position result of the terminal device using the positioning algorithm, the positioning algorithm being a least-squares estimation algorithm that applies a Taylor-series expansion to linearize downlink time-difference-of-arrival, the estimation relying on downlink positioning reference signals transmitted by eighteen transmission reception points wherein each of the transmission reception points having a line-of-sight indicator greater than 0.8, and wherein the least-squares estimation algorithm terminates based on terminating condition when a first one of the following occurs: a difference between a newly estimated location and an immediately prior estimated location is less than 0.001 of a meter, or when 500 iterations are reached;

determining the current convergence speed of the positioning algorithm used when determining the position result of the terminal device, the current convergence speed being defined as the number of iterations that were executed before the terminating condition was satisfied;

determining a relative convergence speed of the positioning algorithm based on the current convergence speed, the relative convergence speed being calculated by dividing the current number of iterations by an average number of iterations that was provided by the LMF for a same stopping condition and for the same set of positioning reference signals and transmission reception points; and indicating to the LMF:
  (i) the relative convergence speed expressed as one of the discrete values 0.5 when the calculated ratio is less than one-half, 1 when the calculated ratio is between one-half and one, 1.5 when the calculated ratio is between one and one-and-a-half, or 2 when the calculated ratio is greater than one-and-a-half;
  (ii) a horizontal protection level equal to 1 meter when the relative convergence speed is less than or equal to 1, and an integrity result of unreliable when the relative convergence speed is greater than or equal to 2; and
  (iii) the determined position result of the terminal device, wherein the apparatus is the terminal device.

9. The system of claim 8, wherein the least-squares estimation algorithm is Chan's variation of least-squares applied to downlink time-difference-of-arrival equations.

10. The system of claim 9, wherein the apparatus is further configured to report both the calculated relative convergence speed and the actual number of iterations executed before the terminating condition was satisfied.

11. The system of claim 10, wherein the average number of iterations used for the relative convergence speed calculation is periodically re-estimated by the terminal device based on a plurality of prior position estimations.

12. The system of claim 11, wherein the apparatus is further configured to map the calculated relative convergence speed to a protection level based on a table received from the LMF, the table associating specific relative convergence speed values with horizontal protection level distances in meters.

13. The system of claim 12, wherein the apparatus is further configured to apply a line-of-sight selection rule requiring use only of transmission reception points having a line-of-sight indicator greater than 0.8 when determining the position result and the relative convergence speed.

14. The system of claim 13, wherein the apparatus is further configured to indicate to the location management function both the determined horizontal protection level and an identification of whether line-of-sight indicators, timing error groups, or relative convergence speed values were considered in deriving the protection level.

15. A method performed by a terminal device, the method comprising:
  receiving, from a location management function (LMF), an indication that the terminal device is to determine a current convergence speed of a positioning algorithm used to determine a position result of the terminal device;
  determining the position result of the terminal device using the positioning algorithm, the positioning algorithm being a least-squares estimation algorithm that applies a Taylor-series expansion to linearize downlink time-difference-of-arrival, the estimation relying on downlink positioning reference signals transmitted by eighteen transmission reception points wherein each of the transmission reception points having a line-of-sight indicator greater than 0.8, and wherein the least-squares estimation algorithm terminates based on terminating condition when a first one of the following occurs: a difference between a newly estimated location and an immediately prior estimated location is less than 0.001 of a meter, or when 500 iterations are reached;
  determining the current convergence speed of the positioning algorithm used when determining the position result of the terminal device, the current convergence speed being defined as the number of iterations that were executed before the terminating condition was satisfied;
  determining a relative convergence speed of the positioning algorithm based on the current convergence speed, the relative convergence speed being calculated by dividing the current number of iterations by an average number of iterations that was provided by the LMF for a same stopping condition and for the same set of positioning reference signals and transmission reception points; and
  indicating to the LMF:
    (i) the relative convergence speed expressed as one of the discrete values 0.5 when the calculated ratio is less than one-half, 1 when the calculated ratio is between one-half and one, 1.5 when the calculated ratio is between one and one-and-a-half, or 2 when the calculated ratio is greater than one-and-a-half;
    (ii) a horizontal protection level equal to 1 meter when the relative convergence speed is less than or equal to 1, and an integrity result of unreliable when the relative convergence speed is greater than or equal to 2; and
    (iii) the determined position result of the terminal device, wherein the apparatus is the terminal device.

16. The method of claim 15, wherein the least-squares estimation algorithm is Chan's variation of least-squares applied to downlink time-difference-of-arrival equations.

17. The method of claim 16, further comprising reporting both the calculated relative convergence speed and the actual number of iterations executed before the terminating condition was satisfied.

18. The method of claim 17, wherein the average number of iterations used for the relative convergence speed calculation is periodically re-estimated by the terminal device based on a plurality of prior position estimations.

19. The method of claim 18, further comprising mapping the calculated relative convergence speed to a protection level based on a table received from the LMF, the table associating specific relative convergence speed values with horizontal protection level distances in meters.

20. The method of claim 19, further comprising applying a line-of-sight selection rule requiring use only of transmission reception points having a line-of-sight indicator greater than 0.8 when determining the position result and the relative convergence speed, and wherein the apparatus is further configured to indicate to the location management function both the determined horizontal protection level and an identification of whether line-of-sight indicators, timing error groups, or relative convergence speed values were considered in deriving the protection level.

* * * * *